United States Patent Office 2,962,812
Patented Dec. 6, 1960

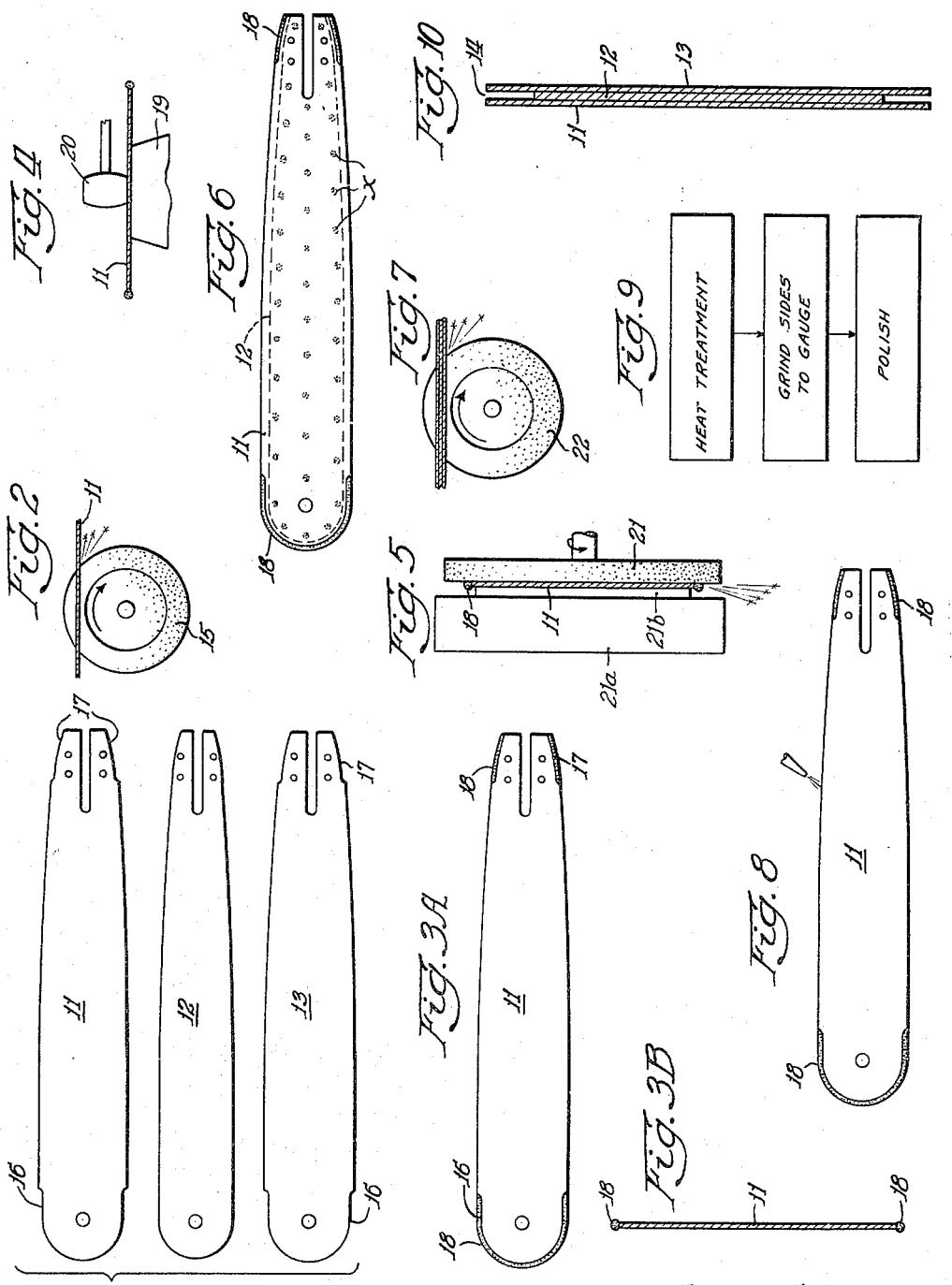

2,962,812

METHOD OF MAKING CHAIN SAW BARS

Dewey E. Gommel, Indianapolis, Ind., assignor to Borg-Warner Corporation, Chicago, Ill., a corporation of Illinois Filed Aug. 2, 1957, Ser. No. 675,857

6 Claims. (Cl. 29—463)

The present invention relates in general to chain saw mounting bars around which a wood cutting saw chain is mounted and is particularly concerned with a new and improved method of manufacturing such chain saw mounting bars.

In the operation of conventional chain saw units, the speed of travel of the saw chain is normally at between 2,000 and 4,000 feet per minute and is sometimes even higher. At the ends of the chain saw bar where the direction of movement of the saw chain reverses itself, there is tremendous friction during the operation of the chain saw unit and this friction causes the end edges of the chain saw bar to heat up at times to a red hot condition. If the edges at the ends of the chain saw bar are not coated with some particularly wear resistant material it is obvious that after a relatively short period of operation of the chain saw, the bar will be substantially unfit for further use.

It has heretofore been proposed to provide such saw chain bars with a hard facing material around the end edges thereof which hard facing material is sufficiently wear and heat resistant to withstand the high temperatures caused by friction during operation of the chain saw unit. However, when such hard facing material is applied either to a solid chain saw bar or to a laminated chain saw bar after the plates comprising the same are welded together, the groove which forms the track around the saw bar and through which the saw chain travels must be ground out by a grinding wheel of approximately 1/16" thickness. Obviously, it is most difficult to provide a track by such a grinding wheel which is straight, with a minimum of snaking in the slot and thin sections along the track rails. Further, when such a grinding wheel is used, it requires a tremendous amount of time per unit produced and there is also considerable danger to the operator of the grinder because of the tendency for the grinding wheels to shatter.

It is therefore a principal object of the present invention to provide an improved method of manufacturing chain saw bars having hard facing material applied to the portions of the peripheral edges thereof which are subject to the most wear during operation of the chain saw units and which method of manufacture eliminates the use of the inherently undesirable narrow grinding wheel formerly utilized to grind out the track around the periphery of the chain saw bar after the hard facing material is applied.

More particularly, the present invention contemplates the method of manufacturing chain saw bars wherein the hard facing material, to be applied to those portions of the bar which are subject to the most wear, is applied prior to the spot welding operation which is used for holding the laminated plates, which make up the saw bar, together.

A particular advantage of the present method, as already stated, is that it eliminates the use of the very narrow grinding wheels and thereby renders the manufacture of the chain saw bars far more safe and economical.

Other advantages and objects of the present invention will become apparent from the following detailed description thereof when read in conjunction with the appended drawings wherein the different figures, for the most part, each represent one of the method steps in carrying out the fabrication of the chain saw bars and wherein:

Fig. 1 illustrates a blanking operation;
Fig. 2 illustrates a grinding operation;
Figs. 3A and 3B illustrate the application of the hard facing material;
Fig. 4 illustrates a blank straightening operation;
Fig. 5 illustrates a grinding operation;
Fig. 6 illustrates the spot welding of the plates together;
Fig. 7 illustrates an edge grinding operation;
Fig. 8 illustrates a spray-welding operation;
Fig. 9 illustrates the final heat treatment grinding and polishing operations; and
Fig. 10 is a sectional view through one of the completed saw chain bars.

With reference now to the drawings, wherein like reference numerals have been used in the different views, the improved method of manufacturing laminated chain saw bars comprising the subject matter of the present invention will now be described.

As is illustrated in Fig. 1, three steel plates represented by reference numerals 11, 12 and 13 are blanked out to the general desired configuration. It will be noted that plate 12 is slightly narrower and shorter than plates 11 and 13 and this is because of the fact that plate 12 will be disposed in the finally assembled chain saw bar intermediate between plates 11 and 13 and will thereby provide a track, as illustrated in Fig. 10 by reference numeral 14, through which the saw chain travels.

The next step in the method disclosed herein comprises the grinding of the edges of the plates 11, 12 and 13 to contour by means of a grinding wheel 15 as shown in Fig. 2. It will be noted that plates 11 and 13 which will comprise the outer plates of the saw chain bar are cut away at either end as illustrated by reference numerals 16 and 17 in Fig. 1. Figs. 3A and 3B illustrate the next method step wherein some hard facing material 18 such as Stellite No. 1, No. 6 or No. 12 or equal, for example, is welded around the edge cut away portions 16 and 17 of the two larger plates 11 and 13.

Following the application of the hard facing material 18 at the ends of the plates 11 and 13, the plates are straightened in any well-known manner such as by means of a hammering operation as is shown in Fig. 4. In Fig. 4 the plate 11 is placed upon an anvil 19 and hammered by a hammer 20. Following the straightening operation, the sides of the plates 11, 12 and 13 are ground as illustrated in Fig. 5 by means of a grinding wheel 21 in order to clean off the excess hard facing material 18 and render the sides of the plates 11, 12 and 13 substantially parallel. The grinding operation shown in Fig. 5 illustrates a magnetic chuck 21a with a metal spacer 21b positioned thereagainst which holds the plate 11 stationary while the grinding operation takes place.

The next method step comprises the spot welding of the plates 11, 12 and 13 together, as is illustrated in Fig. 6, each "X" representing a spot weld and, as is clearly shown in Fig. 6, the intermediate plate 12 is smaller than plates 11 and 13 in order to provide a peripheral groove for the completed chain saw bar.

After the spot welding of the plates 11, 12 and 13 together, the next operation is to grind the edges of the spot welded plates by an edge grinder 22 as shown in Fig. 7. Under some circumstances other portions of the chain saw bar have exhibited a considerable tendency to wear and it may be desirable to apply a relatively thin coating of hard facing material to other portions of the plates 11 and 13. Fig. 8 illustrates the spray-welding of a thin coating of hard facing material to other peripheral portions of the chain saw bar. It will be understood that the hard facing material applied by the spray-welding operation as illustrated in Fig. 8 will fuse with the material of the rail and with the hard facing material 18 welded around the end edges of plates 11 and 13 where the sprayed material meets the hard facing material.

Following the spray-welding operation, if this operation is utilized, the chain saw bar is successively heat treated, the sides thereof are ground to gauge, and finally the chain saw bar is polished.

Chain saw bars produced by the presently disclosed method of fabrication have been found to function particularly well and to exhibit extraordinary wear resistant properties.

It is contemplated that changes and modifications may be made in the present invention without departing from the spirit or scope thereof.

What is claimed is:

1. The method of making chain saw bars comprising the steps of blanking three metal plates, one of which is smaller than the other two in order to form a central peripheral slot extending around the finished chain saw bar, applying a hard facing material to improve the wearing characteristics around the peripheral portions of said plates in the regions most subject to wear, finishing said hard facing material to the proper external contour, spot welding the three plates together with the smaller one intermediate the other two in order to form a peripheral saw chain guide slot around the bar, and thereafter heat treating and finishing the bar.

2. The method of making chain saw bars comprising the steps of blanking three metal plates, one of which is smaller than the other two in order to form a central peripheral slot extending around the finished chain saw bar, applying a hard facing material to improve the wearing characteristics around the peripheral end regions of the plates which are most subject to wear, finishing said hard facing material to the proper external contour, spot welding the three plates together with the smaller one intermediate the other two in order to form a peripheral saw chain guide slot around the bar, and thereafter heat treating and finishing the bar.

3. The method of making chain saw bars comprising the steps of blanking three metal plates, one of which is smaller than the other two in order to form a central peripheral slot extending around the finished chain saw bar, said two large plates being cut away slightly around the edge at the ends thereof, applying a hard facing material to the cut away end edges of said two large plates to improve the wearing characteristics of the ends of the bar which are particularly subject to wear, finishing said hard facing material to the proper external contour, spot welding the three plates together with the smaller one intermediate the other two in order to form a peripheral saw chain guide slot around the bar, and thereafter heat treating and finishing the bar.

4. The method of making elongate chain saw bars, comprising the steps of blanking out three elongate metal plates, one of said three plates being smaller than the other two in order to form a peripheral channel extending around the finished chain saw bar, grinding the edges of said plates to contour, applying a hard facing material to improve the wearing characteristics around the peripheral portions of said plates in the regions thereof which are most subject to wear, straightening the plates, grinding the sides of the plates and the hard facing material to parallel and the peripheral portions of the hard facing material to contour, spot welding the three plates together with the smaller one intermediate the other two in order to form a peripheral saw chain guide slot around the bar, and thereafter heat treating the bar, grinding the sides to gauge and polishing the sides of the bar.

5. The method of making elongate chain saw bars, comprising the steps of blanking out three elongate metal plates, one of said three plates being smaller than the other two in order to form a peripheral channel extending around the finished chain saw bar, grinding the edges of said plates to contour, said two large plates being cut away slightly around the edge at the ends thereof, applying a hard facing material to the cut away end edges of said two large plates to improve the wearing characteristics of the ends of the bar which are particularly subject to wear, straightening the plates, grinding the sides of the plates and the hard facing material to parallel and the peripheral portions of the hard facing material to contour, spot welding the three plates together with the smaller one intermediate the other two in order to form a peripheral saw chain guide slot around the bar, and thereafter heat treating the bar, grinding the sides to gauge and polishing the sides of the bar.

6. The method of making elongate chain saw bars, comprising the steps of blanking out three elongate metal plates, one of said three plates being smaller than the other two in order to form a peripheral channel extending around the finished chain saw bar, grinding the edges of said plates to contour, said two large plates being cut away slightly around the edge at the ends thereof, applying a relatively thick coat of hard facing material to the cut away end edges of said two large plates to improve the wearing characteristics of the ends of the bar which are particularly subject to wear, straightening the plates, grinding the sides of the plates and the hard facing material to parallel and the peripheral portions of the hard facing material to contour, spot welding the three plates together with the smaller one intermediate the other two in order to form a peripheral saw chain guide slot around the bar, applying a relatively thin coat of hard facing material to other portions of the bar which are subject to wear, and thereafter heat treating the bar, grinding the sides to gauge and polishing the sides of the bar.

References Cited in the file of this patent

UNITED STATES PATENTS

| | | |
|---|---|---|
| 830,860 | Smith | Sept. 11, 1906 |
| 1,999,599 | Smith | Apr. 30, 1935 |
| 2,315,357 | Smith | Mar. 30, 1943 |
| 2,660,204 | Rosenboom | Nov. 24, 1953 |
| 2,703,928 | Southwick | Mar. 15, 1955 |
| 2,761,189 | Robbins | Sept. 4, 1956 |
| 2,838,833 | Richardson | June 17, 1958 |

FOREIGN PATENTS

| | | |
|---|---|---|
| 728,639 | Germany | Dec. 1, 1942 |